(12) United States Patent
Stroucken

(10) Patent No.: US 6,802,804 B1
(45) Date of Patent: Oct. 12, 2004

(54) METHOD AND A DEVICE FOR SEPARATION OF A SURFACE LAYER OF A LIQUID BODY

(75) Inventor: Klaus Hans Dieter Stroucken, Rönninge (SE)

(73) Assignee: Alfa Laval AB, Tumba (SE)

( * ) Notice: Subject to any disclaimer, the term of this patent is extended or adjusted under 35 U.S.C. 154(b) by 0 days.

(21) Appl. No.: 09/958,389

(22) PCT Filed: Mar. 21, 2000

(86) PCT No.: PCT/SE00/00551
§ 371 (c)(1),
(2), (4) Date: Oct. 9, 2001

(87) PCT Pub. No.: WO00/59639
PCT Pub. Date: Oct. 12, 2000

(30) Foreign Application Priority Data

Apr. 7, 1999  (SE) .............................................. 9901235

(51) Int. Cl.⁷ ................................................ B04B 11/02
(52) U.S. Cl. ............................. 494/37; 494/41; 494/42; 494/62; 494/65
(58) Field of Search ........................... 494/5, 6, 35, 37, 494/38, 41, 42, 50, 60, 62, 65, 68–70, 901; 210/121, 122, 360.1

(56) References Cited

U.S. PATENT DOCUMENTS 2,881,974 A  *  4/1959  Ruf
2,928,592 A  *  3/1960  Johnson
3,633,749 A      1/1972  Panosh
4,753,632 A  *  6/1988  Hofmann et al.
5,484,282 A  *  1/1996  Trawoger et al.
5,693,218 A     12/1997  Yamamoto et al.

FOREIGN PATENT DOCUMENTS

| EP | 0 164 866 | 12/1985 |
| EP | 0 312 279 B1 | 4/1991 |
| EP | 0 312 233 B1 | 5/1992 |
| WO | WO 96/33021 | 10/1996 |
| WO | WO 96/33022 | 10/1996 |

* cited by examiner

Primary Examiner—Charles E. Cooley
(74) Attorney, Agent, or Firm—McCormick, Paulding & Huber LLP

(57) ABSTRACT

To clean a relatively heavy liquid from small amounts of relatively light liquid the liquids are first introduced into a container, in which the light liquid is allowed to collect on the surface of the heavy liquid. A surface layer of the liquid body in the container, constituting a mixture of the two liquids, is caused to flow over an overflow outlet member into a collecting chamber. From the collecting chamber the liquid mixture is pumped further into a centrifugal separator, wherein the relatively light liquid is separated from the relatively heavy liquid. According to the invention the liquid mixture is pumped from the collecting chamber to the centrifugal separator through a pumping member, which is connected with a rotor of the centrifugal separator and, thus, rotates therewith.

19 Claims, 3 Drawing Sheets

METHOD AND A DEVICE FOR SEPARATION OF A SURFACE LAYER OF A LIQUID BODY

This application is entitled to the benefit of and incorporates by reference essential subject matter disclosed in PCT/SE00/00551 patent application filed on Mar. 21, 2000 and Swedish Patent Application 9901235-3 filed on Apr. 7, 1999.

FIELD OF THE INVENTION

The present invention relates to a method and a device for removing from a liquid body a liquid mixture, which forms a surface layer on the liquid body, and separating this liquid mixture into one relatively light liquid and one relatively heavy liquid.

BACKGROUND OF THE INVENTION

In workshops with machine tools for turning and cutting of metal pieces there is a need for a method and a device of the aforementioned kind for cleaning of liquids used for cooling purposes in the machine tools. Coolants of this kind normally are water based and deteriorate during use by, among other things, small amounts of oil being mixed with the coolant, such as hydraulic oil and lubricating oil, used for the operation of the machine tools. Oil of this kind causes an unpleasant smell and makes the coolant unusable in the course of time, if it is not separated from the coolant. It is known to clean coolants from oil by means of a centrifugal separator. In practice, this is performed such that a liquid mixture in the form of coolant and undesired oil is allowed to flow from a surface layer of a liquid body, containing the coolant to be cleaned, over an overflow outlet member into a collecting chamber. The liquid mixture is then pumped from the collecting chamber by means of a pumping device to the centrifugal separator.

Even in other connections there is a need for a method and a device for removing from a relatively heavy liquid, small amounts of a relatively light liquid. For example, liquids used for cleaning purposes often must have light floating contaminants removed therefrom, so that the liquid can be used anew.

The object of the present invention is to make possible cleaning of a relatively heavy liquid from small amounts of a relatively light liquid in a simple and non-expensive way by means of a simple and inexpensive device. The device should be compact and easily mountable to a container which contains liquid to be cleaned. Furthermore, the device should be operable automatically, and a desired cleaning effect should be obtainable without the need for complicated coordination of the operation of a centrifugal separator and a pumping device required for pumping the liquid to the centrifugal separator.

SUMMARY OF THE INVENTION

For achievement of this purpose the invention suggests a method of removing from a liquid body a liquid mixture, which forms a surface layer on the liquid body, and separating this liquid mixture into one relatively light liquid and one relatively heavy liquid, the liquid mixture being first caused to flow, as previously known, from the liquid body over an overflow outlet member into a collecting chamber and then pumped therefrom into a centrifugal separator. The method according to the invention is characterized in that the liquid mixture is pumped from the collecting chamber upwardly and into a rotating centrifugal rotor, forming part of the centrifugal separator, by means of a pumping member that is connected with the centrifugal rotor and is rotating therewith and extends down into the liquid mixture in the collecting chamber. Preferably, the overflow outlet member is vertically movable relative to the pumping member, further liquid mixture being caused to flow over from the liquid body to the collecting container in an amount per unit of time corresponding to the capacity of the pumping member and/or the corresponding centrifugal rotor.

For achieving a desired function of the vertically movable overflow outlet member a previously known technique may be used. Thus, the overflow outlet member may be kept floating on said liquid body, in accordance with U.S. Pat. No. 3,633,749, or be kept floating on the liquid mixture present in said collecting chamber, as set forth in U.S. Pat. No. 5,693,218. Alternatively, a different technology may be employed for automatic control of the amount of liquid mixture that is to flow over from the surface layer of the liquid body to the collecting chamber. A basic mission for the overflow outlet member is to adapt the flow of new liquid mixture into the collecting chamber to the flow of liquid mixture pumped up from the collecting chamber to the centrifugal rotor by means of the pumping device.

If the level of the surface layer of the liquid body is changed, it is desirable that the overflow outlet member automatically adapts itself thereto. This requires, if the collecting chamber is delimited by a collecting container having certain vertically immobile parts, that at least part of one wall of the collecting container is vertically movable together with the overflow outlet member.

In a preferred embodiment of the invention a collecting container wall part of this kind includes a bellows but, alternatively, sealing devices of different kinds may be used between the overflow outlet member and vertically immobile parts of the collecting container.

For cleaning of a liquid mixture, which has been transferred in the above described manner from the surface layer of a liquid body to a collection container for further transportation to a centrifugal separator, it is suggested according to the invention that the centrifugal separator includes a centrifugal rotor, which is connected with a pumping device adapted to extend from above and downwards into the liquid mixture present in the collecting container. The centrifugal separator further includes a driving device, which is adapted to drive the centrifugal rotor as well as the pumping device connected therewith wherein the pumping device is adapted to pump the liquid mixture to and into the centrifugal rotor. The pumping device may be designed in many different ways. Preferably, it includes a pumping member which is directly connected with the centrifugal rotor so that the common driving device may be adapted for rotation of both, the centrifugal rotor and the pumping member through one and the same transmission device. However, this is not absolutely necessary according to the invention. Alternatively, the driving device may be coupled separately to the pumping member, in which case a gear device of one kind or another may be used between the driving device and one of the centrifugal rotor and the pumping member. Most important is that an increased rotational speed of the pumping member, meaning an increased liquid flow to the centrifugal rotor, brings with it a corresponding increase of the separation capability of the centrifugal rotor as a consequence of an increased rotational speed thereof.

In a preferred embodiment of the invention a pumping device includes a tubular pumping member, which is rotatable around a substantially vertical rotational axis, the pumping member defining a central pumping channel for conducting liquid mixture from the collection container to the centrifugal rotor. Preferably, both the centrifugal rotor and the pumping member are rotatable around said vertical rotational axis, and in the preferred embodiment the pumping member, as mentioned, is directly connected with the centrifugal rotor for rotation together therewith. A pumping device of this kind does not subject the liquid to large shear forces. Shear forces of this kind are disadvantageous in this connection, since they cause undesired formation of emulsion of the two liquids to be separated from each other in the centrifugal separator.

The method and the device according to the invention may be used for continuous cleaning of a liquid, cleaned liquid being returned directly to said liquid body. The cleaned liquid is preferably returned to a level below the predetermined surface layer of the liquid body, so that the pre-separation having occurred in the liquid body is disturbed as little as possible. In the device according to the invention the returning is made by means of a stationary casing, which surrounds the centrifugal rotor and which has a returning member extending down into the liquid body to said level.

As mentioned, the rotatable pumping member extending down into the liquid to be cleaned is preferably tubular. For minimizing the wetted surface of the pumping member and/or for avoiding that liquid is pumped upwardly on the outside of the pumping member, the present invention provides a non-rotatable wall adapted to extend from above and down into the liquid mixture. During operation of the device, a sealing device provided in the collecting container is arranged to seal between the non-rotatable wall and the rotatable pumping member. The sealing device may have any suitable design. For instance, an annular lip gasket of rubber or some other elastic material may be supported by the non-rotatable wall and surround the pumping member and seal radially against the outside thereof. Alternatively, a similar annular lip gasket may be supported by the rotatable pumping member, so that by means of the centrifugal force it may be kept pressed radially outwardly against the surrounding non-rotatable wall.

In a preferred embodiment of the invention the sealing device includes an annular axially movable sealing member and means adapted to accomplish an axial sealing force between the non-rotatable wall or non-rotatable members connected therewith and the rotatable pumping member. The sealing member may be rotatable together with the pumping member, but preferably it is non-rotatable and adapted to be pressed axially against a sealing surface, preferably an end surface of the rotatable pumping member.

A non-rotatable wall of the aforementioned kind, which surrounds the pumping member, protects against unintentional contacts with the pumping member during rotation thereof.

If the centrifugal rotor is suspended from a flexible suspension device, said non-rotatable wall is preferably suspended from the same flexible suspension device for avoidance of relative pendulum movements between the rotatable and non-rotatable sealing surfaces of the sealing device during operation of the centrifugal rotor.

BRIEF DESCRIPTION OF THE DRAWINGS

The invention is described following with reference to the accompanying drawings, in which.

DETAILED DESCRIPTION OF THE PREFERRED EMBODIMENTS

Figure 1:
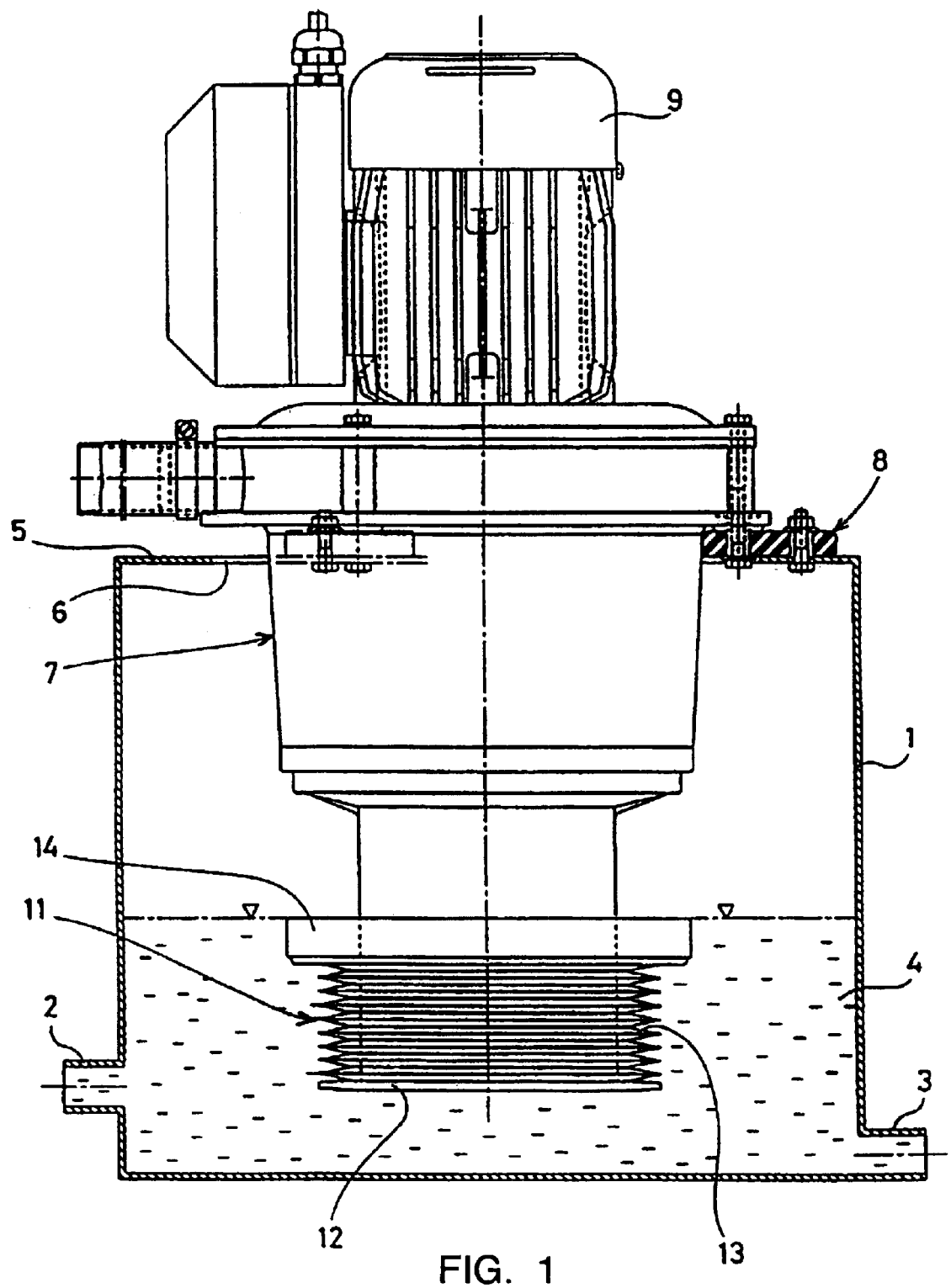
FIG. 1 is a side elevational view of a separation device according to the present invention shown mounted on a container containing liquid to be treated in the separation device. The container is shown in a section view.
Figure 2:
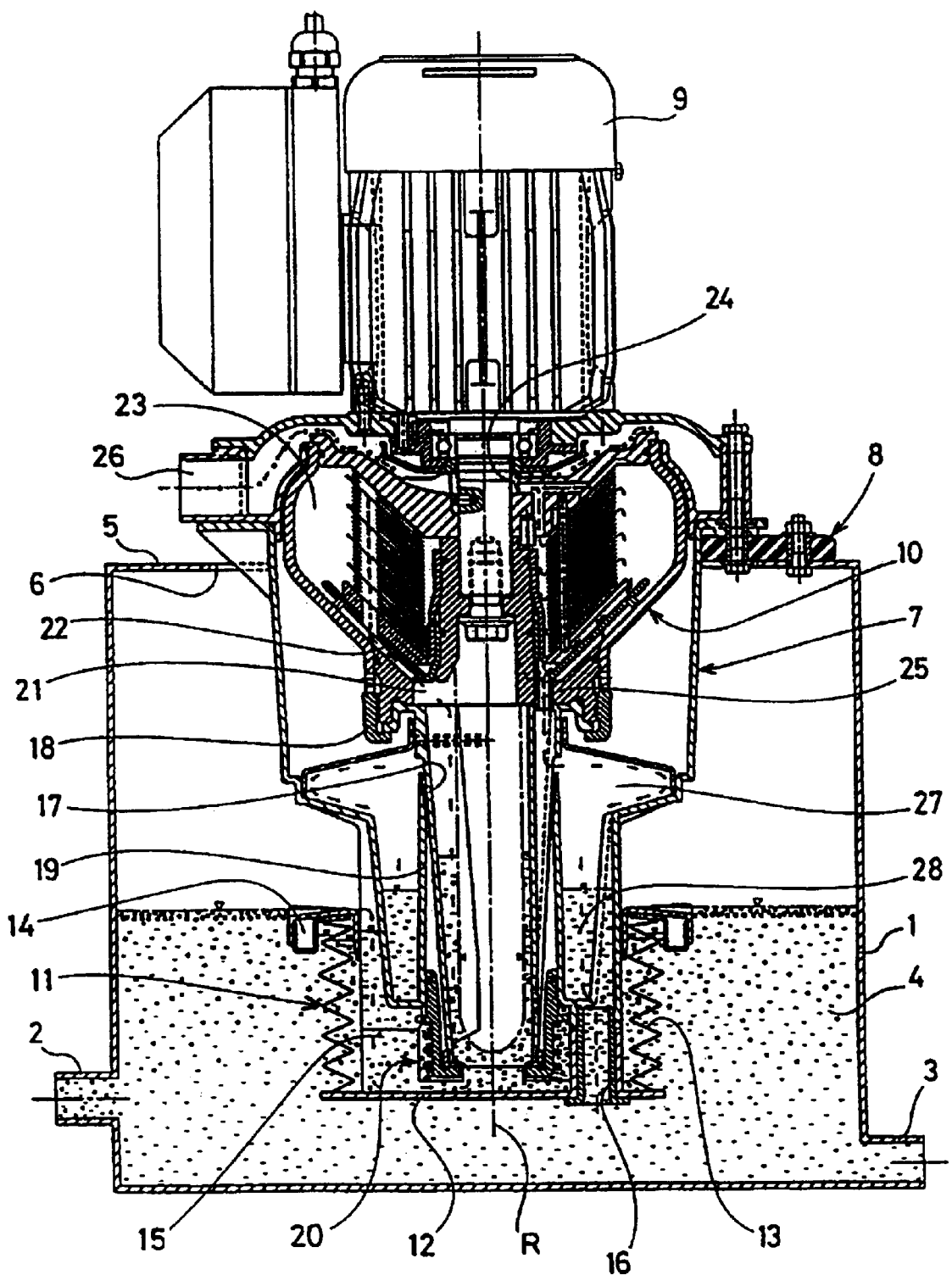
FIG. 2 is a partly in section view of the separation device and container of FIG. 1.

FIGS. 1 and 2 show a container 1 containing liquid, which may be intended for use as a coolant in machine tools for turning or cutting of metal pieces. Liquid of this kind may be water based, and deteriorates upon use due to the presence of small amounts of oil. Used coolant enters the container 1 through an inlet 2 and cleaned coolant leaves the container through an outlet 3 to be reused. While the coolant is present in the container 1 it forms a liquid body 4, in which the oil is collected in a thin surface layer at the top of the liquid body 4.

The container 1 has a horizontal upper limiting wall 5 having an opening 6, through which a separation device according to the invention extends from above and down into the container. The separation device, which forms a self sustaining unit mounted onto the container 1, includes a casing 7, which is suspended from the upper limiting wall 5 of the container through a flexible suspension device 8. Only one of three alike parts of the suspension device 8 is shown in the drawing. Furthermore, the separation device includes a motor 9, which is fastened to the upper part of the casing 7, and a centrifugal rotor 10 (FIG. 2) suspended from the motor and surrounded by the casing 7. The motor is adapted to drive the centrifugal rotor 10 around a vertical rotational axis R.

The separation device further includes a collecting container 11, which is supported by the casing 7 within the container 1 in a way such that it is surrounded by the liquid body 4. The collecting container 11 includes a bottom plate 12, a surrounding wall in the form of a bellows 13 circular in cross section and fastened at its lower part to the bottom plate 12, and an annular floater 14, which is fastened to the upper part of the bellows 13. The floater 14 is adapted to float on the liquid body 4 and to form an overflow outlet member, over which a surface layer of the liquid body 4 may flow into the collecting container 11. The upper side of the floater has several radial recesses or grooves, through which the liquid may flow into the collecting container evenly distributed around the whole of the floater. The grooves give to the floater a stability, so that it moves the same extent vertically around the whole of its circumference.

FIG. 2 shows that the collecting container 11 delimits a collecting chamber 15 for a liquid mixture entering therein through the overflow outlet member (the floater) 14. The liquid mixture consists mainly of coolant, which is relatively heavy, and a small amount of oil, which is relatively light. Furthermore, FIG. 2 shows that the bottom plate 12 of the collecting container is supported by a casing 7 by means of a sleeve 16.

At its lower part the centrifugal rotor 10 carries a tubular, slightly conical pumping member 17, which extends down into the collecting chamber 15. The pumping member 17, which is fastened to the centrifugal rotor 10 by means of a lock ring 18, is surrounded by a substantially cylindrical non-rotatable wall 19, which is supported by the casing 7 and extends from an area above the liquid body 4 down into the collecting chamber 15. At its lower part the wall 19 carries a sealing device 20 adapted to seal against the lowermost part of the pumping member 17, so that liquid mixture present the collecting chamber 15 will not get into contact with the outside of the pumping member 17. The sealing device 20 is described in detail below with reference to FIG. 3.

The centrifugal rotor 10 may be of a conventional kind and is therefore not described in detail. For a closer description of the centrifugal rotor of a suitable kind reference is made to, for instance, EP 312 233 B1, EP 312 279 B1, WO 96/33021 and WO 96/33022.

The centrifugal rotor 10 has an inlet chamber 21, which through a channel 22 communicates with a separation chamber 23. Furthermore, the centrifugal rotor 10 has a first outlet 24 for a separated relatively light liquid, in this case oil, and a second outlet 25 for a separated relatively heavy liquid, in this case water based coolant. The casing 7 has a first outlet 26 adapted to receive separated oil leaving the centrifugal rotor through its outlet 24 and a second outlet 27 adapted to receive separated coolant leaving the centrifugal rotor through its outlet 25.

Separated oil is conducted through the outlet 26 to some suitable recipient therefor, whereas separated coolant is conducted through spaces in the casing 7 back to the liquid body 4. Thus, the casing 7 is formed so that separated coolant is conducted on the outside of the stationary wall 19, which surrounds the pumping member 17, down to and through the aforementioned sleeve 16. As can be seen in FIG. 2, there is delimited within the casing 7 a return chamber 28, in which returned cleaned coolant forms a liquid body, the free liquid surface of which during operation of the separation device will be present somewhat above the liquid surface of the liquid body 4.

Figure 3:
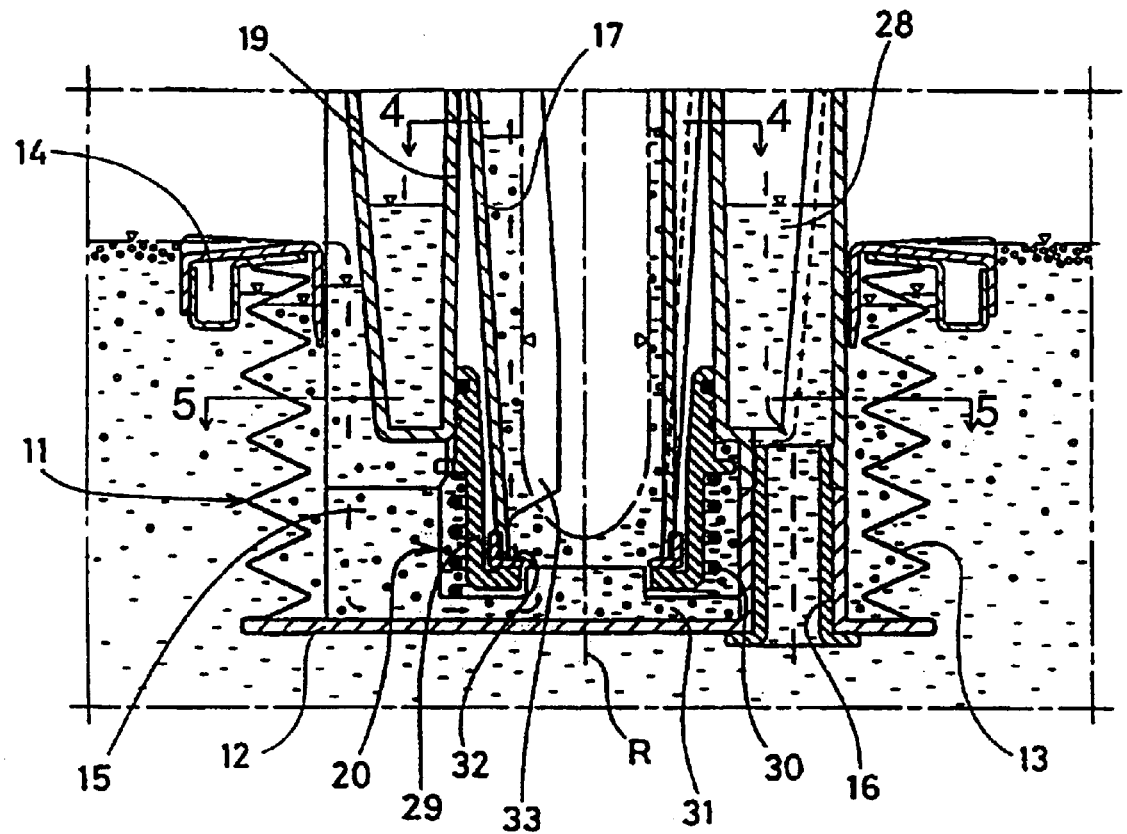
FIG. 3 is a partial enlarged view of the separation device of FIG. 2.

FIG. 3 shows in a larger scale than FIG. 2 the collecting container 11 and the sealing device 20. As shown in FIG. 3, the sealing device 20 includes an axially movable sealing member 29. The sealing member 29 is adapted by means of a sleeve formed upper portion to seal against the inside of the stationary cylindrical wall 19 and by means of an annular lower portion to seal against the rotatable pumping member 17. A screw spring 30 resting on wings 31 is adapted to press the sealing member 29 upwards, with reference to FIG. 3, into sealing engagement with the pumping member 17. For this purpose, the pumping member 17 carries at its lowermost part a sealing member 32 rotatable therewith. The sealing members 29 and 32 abut against each other through axially facing sealing surfaces.

The wings 31 are connected with the bottom plate 12 and are intended, apart from supporting the spring 30, for counteracting rotation of liquid in the collecting container 15 in the area of the lower part of the pumping member 17. As shown in FIG. 3, at least one of the wings 31 extends all the way up to the inlet opening of the pumping member 17 in the area of the sealing member 32.

Figure 4:
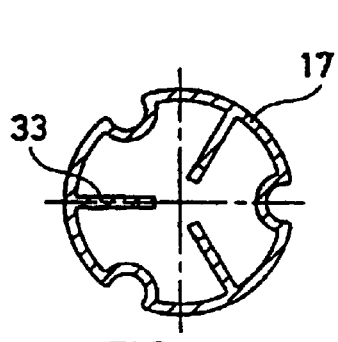
FIG. 4 is a sectional view of the separation device of FIG. 3 taken along the line 4—4 in FIG. 3.

FIG. 4 shows a section through the pumping member 17 along the line 4—4 of FIG. 3 illustrating the pumping member 17 having three internal axially and radially extending wings 33 intended for entrainment of liquid in the rotation of the pumping member.

Figure 5:
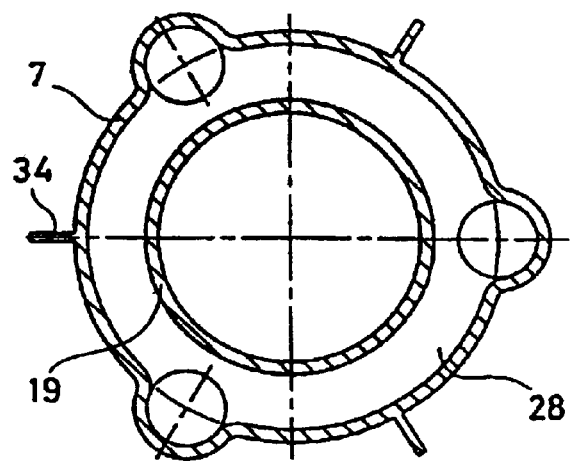
FIG. 5 is a sectional view of the separation device of FIG. 3 taken along the line 5—5 in FIG. 3.

FIG. 5 shows a section through the casing 7 along the line 5—5 of FIG. 3. As shown, the outside of the casing 7 has three wings 34 extending both radially and axially therefrom. The wings 34 have, like the wings 31, a function of counteracting rotation of liquid in the collecting chamber 15.

The separation device according to the invention operates in the following manner:

The floater 14 is formed such that, as long as no liquid is present in the collecting container 11, it may float on the liquid body 4 but only at a level such that a surface layer of the liquid body 4 flows over the floater 14 and into the collecting container 11. When the liquid surface in the collecting container 11 approaches the floater 14, the floater is actuated also by the liquid in the collecting container 11. Then, the floater 14 is lifted up to a level such that it blocks further inflow of liquid into the collecting container 11. This occurs before the liquid surface in the collecting container 11 has reached up to the same level as the liquid surface in the surrounding container 1.

When the motor 9 is started for driving the centrifugal rotor 10 and the pumping member 17 connected therewith around the rotational axis R, liquid is pumped from the collecting container 11 upwardly through the pumping member 17 and into the centrifugal rotor 10. The liquid surface will then sink in the collecting container 11, whereby also the floater 14 will sink somewhat, and new liquid will flow into the collecting container 11 from the surface layer of the liquid body 4. If an even flow of liquid is pumped out of the collecting container 11, the liquid surface therein will be adjusted to a certain level, as can be seen in FIGS. 2 and 3, and the same amount of liquid will flow in via the floater 14 out through the pumping member 17.

In the pumping member 17 a substantially cylindrical liquid surface will be formed, as is illustrated in FIG. 2, which extends all the way from the lower part of the pumping member to the inlet chamber 21 of the centrifugal rotor. In the liquid body, which is thus formed in the pumping member 17 and which is entrained in its rotation by the wings 33 (see FIG. 4), liquid flows axially upwardly as illustrated by means of arrows in the FIGS. 2 and 3. Centrally in the pumping member 17 there is left an air filled space which, if desired, may communicate with air surrounding the pumping member 17. For this purpose the pumping member 17 may carry a small pipe, which extends from the centre of the pumping member radially outwardly to the outside of the pumping member. A pipe of this kind is indicated by dotted lines in FIG. 2 at the upper part of the pumping member 17.

Liquid entering the inlet chamber 21 of the centrifugal rotor 10 through the pumping member 17 is conducted therefrom through the inlet channel 22 into the separation chamber 23. In this chamber there is arranged a set of conical separation discs, which between themselves form thin separation spaces. In the separation spaces the small drops of oil suspended in the coolant are separated by being forced by the centrifugal force to move towards the rotational axis of the centrifugal rotor and out through the outlet 24. The coolant freed from oil first flows in a direction from the rotational axis of the centrifugal rotor out of said separation spaces and then through one or more collecting channels back towards the rotational axis to the centrifugal rotor outlet 25 for cleaned coolant.

Whereas separated oil is conducted through the outlet 26 in the casing 7 to a particular recipient therefore, the cleaned coolant is conducted through the outlet 27 back to the liquid body 4 in the container 1. Thus, the coolant is conducted from the outlet 27 to the return chamber 28 and from there through the pipe 16 out into the liquid body 4.

Since the amount of oil separated from the coolant is extremely small, there is returned to the liquid body 4 a flow of liquid which is substantially of the same magnitude as that passing via the floater 14 into the collecting container 11. A certain difference as to levels comes up between the liquid surfaces in the return chamber 28 and in the surrounding container 1, respectively, as illustrated in the FIGS. 2 and 3.

As also illustrated in the FIGS. 2 and 3, there are formed in the area of the floater 14 two particular liquid surfaces immediately inside and outside, respectively, the bellows 13. These liquid surfaces are formed because air has been enclosed on the underside of the floater both inside and outside the collecting container 11. It should be mentioned, that the overpressure coming up in the air thus trapped contributes to the floating ability of the floater 14.

As can be understood, the floater 14 adapts its position to the amount of liquid present in the container 1, whereas the bottom plate 12 is maintained at an unchanged level. Furthermore it can be understood, that the pumping capacity of the pumping member 17 is automatically increased, if the separation capacity of the centrifugal rotor is increased by increasing of its rotational speed. Upon such an increase of the pumping capacity the inflow of liquid into the collecting container 11 from the liquid body 4 automatically increases.

The collecting container 11 need not necessarily be carried by the casing 7, which surrounds the centrifugal rotor 10 and the pumping member 17. Alternatively, it may be supported by the container 1, e.g. stand on its bottom. Also, the stationary wall 19, which surrounds the pumping member 17 and supports part of the sealing device 20, need not be carried by the casing 7. Even the wall 19 may alternatively be carried by the container 1. However, the arrangement shown in the drawing is advantageous for several reasons. Thus, for the function of the sealing device 20 it is advantageous that both of the co-operating sealing members 29 and 32 are carried by one and the same suspension device. Since a suspension device for the rotatable centrifugal rotor 10 should be flexible and thus, the rotatable part of the sealing device 20 becomes flexibly suspended, also the non-rotatable part of the sealing device should be flexibly suspended. Furthermore, since the non-rotatable wall 19 around the pumping member 17 is preferably flexibly suspended, it is also advantageous that the collecting container 11 is flexibly suspended from the same suspension advice. Thereby, for instance the wall 19 or other members connected therewith may be used for guiding the vertical movements of the floater 14. In the shown arrangement the wings 34 (see FIG. 5) are used for such guiding.

What is claimed is:

1. A device for removing from a liquid body a liquid mixture which forms a surface layer on the liquid body, and separating the liquid mixture into one relatively light liquid and one relatively heavy liquid, the device comprising:
   a vertically movable overflow outlet member adapted to be overflowed by the liquid mixture from the surface layer of the liquid body,
   a collecting container adapted to receive the liquid mixture having overflowed the overflow outlet member,
   a centrifugal separator adapted to receive the liquid mixture from the collecting container and to separate it into the relatively light liquid and the relatively heavy liquid,
   the centrifugal separator including a centrifugal rotor connected with a pumping device extending down into liquid mixture in the collecting container, the centrifugal separator further including a driving device, adapted to drive the centrifugal rotor as well as the pumping device connected therewith, and wherein the pumping device is adapted to pump the liquid mixture to and into the centrifugal rotor.

2. A device according to claim 1, wherein the pumping device includes a pumping member connected to the centrifugal rotor and rotatable therewith around a rotational axis common to the pumping member and the centrifugal rotor.

3. A device according to claim 2, wherein the pumping member is tubular and has a central pumping channel for pumping the liquid mixture from the collecting container to the centrifugal rotor.

4. A device according to claim 2, wherein the centrifugal rotor and the pumping member are rotatable around a substantially vertical rotational axis.

5. A device according to claim 2, wherein the pumping member is surrounded by a non-rotatable wall extending down into the liquid mixture in the collecting container and a sealing device is adapted to seal between the non-rotatable wall and the rotatable pumping member so that the liquid mixture is prevented from moving upwardly on the outside of the pumping member as a consequence of the rotation thereof.

6. A device according to claim 5, wherein the centrifugal rotor is suspended from a flexible suspension device and the non-rotatable wall is also suspended from the flexible suspension device for avoiding relative pendular movements between the non-rotatable wall and the rotatable pumping member during operation of the centrifugal rotor.

7. A device according to claim 5, wherein the sealing device comprises an annular axially movable sealing member and means adapted to accomplish an axial sealing force between the non-rotatable wall and the rotatable pumping member.

8. A device according to claim 7, wherein the annular sealing member is non-rotatable and adapted to be pressed axially against the rotatable pumping member.

9. A device according to claim 8, wherein the pumping member is tubular and the non-rotatable sealing member is adapted to be pressed against an end surface defined by the rotatable pumping member.

10. A device according to claim 5, wherein the collecting container is suspended from the non-rotatable wall.

11. A device according to claim 10, wherein the centrifugal rotor is surrounded by a casing which delimits spaces for receiving separated relatively heavy liquid and conducting the relatively heavy liquid via a passage extending through the collecting container to the liquid body.

12. A device according to claim 1, wherein members are arranged in the collecting container for counteracting liquid rotation therein.

13. A device according to claim 1 wherein means are provided for overflow outlet member floating on one of said liquid body and said liquid mixture in the collecting container.

14. A method according to claim 13, in which the separated relatively heavy liquid is conducted back to the liquid body via a passage extending through the collecting chamber.

15. A method of removing from a liquid body a liquid mixture, which forms a surface layer on the liquid body, and separating the liquid mixture into one relatively light liquid and one relatively heavy liquid, the method comprising the steps of:
   causing the liquid mixture to flow from the liquid body over an overflow outlet member into a collecting chamber;
   pumping the liquid mixture from the collecting chamber into a centrifugal separator;

the pumping being accomplished by rotating a pumping member extending down into the liquid mixture in the collecting chamber and transferring the liquid mixture upwardly into a centrifugal rotor rotating with the pumping member, the pumping member being connected to the centrifugal rotor; and wherein the overflow outlet member floats on one or both of the liquid body and the liquid mixture present in the collecting chamber.

16. A method of removing from a liquid body a liquid mixture, which forms a surface layer on the liquid body, and separating the liquid mixture into one relatively light liquid and one relatively heavy liquid, the method comprising the steps of:

causing the liquid mixture to flow from the liquid body over an overflow outlet member into a collecting chamber;

pumping the liquid mixture from the collecting chamber into a centrifugal separator;

the pumping being accomplished by rotating a pumping member extending down into the liquid mixture in the collecting chamber and transferring the liquid mixture upwardly into a centrifugal rotor rotating with the pumping member, the pumping member being connected to the centrifugal rotor; and wherein the overflow outlet member is vertically movable relative to the pumping member, the method further including causing the liquid mixture to flow from the liquid body to the collecting chamber at the same rate as that by which the liquid mixture is pumped by means of the pumping member into the centrifugal rotor.

17. A method of removing from a liquid body a liquid mixture, which forms a surface layer on the liquid body, and separating the liquid mixture into one relatively light liquid and one relatively heavy liquid, the method comprising the steps of:

causing the liquid mixture to flow from the liquid body over an overflow outlet member into a collecting chamber, the liquid being conducted into the collecting chamber around an entire circumference defined by the pumping member;

pumping the liquid mixture from the collecting chamber into a centrifugal separator; and wherein the pumping is accomplished by rotating a pumping member extending down into the liquid mixture in the collecting chamber and transferring the liquid mixture upwardly into a centrifugal rotor rotating with the pumping member, the pumping member being connected to the centrifugal rotor.

18. A method of removing from a liquid body a liquid mixture, which forms a surface layer on the liquid body, and separating the liquid mixture into one relatively light liquid and one relatively heavy liquid, the method comprising the steps of:

causing the liquid mixture to flow from the liquid body over an overflow outlet member into a collecting chamber;

pumping the liquid mixture from the collecting chamber into a centrifugal separator;

the pumping being accomplished by rotating a pumping member extending down into the liquid mixture in the collecting chamber and transferring the liquid mixture upwardly into a centrifugal rotor rotating with the pumping member, the pumping member being connected to the centrifugal rotor;

the liquid mixture the pumped upwardly through the rotating pumping member from the collecting chamber to the centrifugal rotor; and while the liquid mixture is still in the collecting chamber, the liquid mixture is kept separate from contact with the outside of at least part of the pumping member by means of a sealing device.

19. A method of removing from a liquid body a liquid mixture, which forms a surface layer on the liquid body, and separating the liquid mixture into one relatively light liquid and one relatively heavy liquid, the method comprising the steps of:

causing the liquid mixture to flow from the liquid body over an overflow outlet member into a collecting chamber;

pumping the liquid mixture from the collecting chamber into a centrifugal separator;

the pumping being accomplished by rotating a pumping member extending down into the liquid mixture in the collecting chamber and transferring the liquid mixture upwardly into a centrifugal rotor rotating with the pumping member, the pumping member being connected to the centrifugal rotor; and returning the relatively heavy liquid to the liquid body at a level below the surface layer of the liquid body.

* * * * *

UNITED STATES PATENT AND TRADEMARK OFFICE
CERTIFICATE OF CORRECTION

PATENT NO. : 6,802,804 B1
DATED : October 12, 2004
INVENTOR(S) : Klaus Hans Dieter Stroucken It is certified that error appears in the above-identified patent and that said Letters Patent is hereby corrected as shown below:

<u>Column 8,</u>
Line 51, after "provided for" please insert -- keeping the --.

Signed and Sealed this

Fifth Day of April, 2005

JON W. DUDAS
*Director of the United States Patent and Trademark Office*